US012586577B2

(12) United States Patent
Nguyen et al.

(10) Patent No.: US 12,586,577 B2
(45) Date of Patent: Mar. 24, 2026

(54) AUTOMATIC SPEECH RECOGNITION USING MULTIPLE LANGUAGE MODELS

(71) Applicant: Zoom Video Communications, Inc., San Jose, CA (US)

(72) Inventors: Thai Son Nguyen, Karlsruhe (DE); Jie Pu, Baden-Württemberg (DE); Sebastian Stüker, Karlsruhe (DE)

(73) Assignee: Zoom Communications, Inc., San Jose, CA (US)

( * ) Notice: Subject to any disclaimer, the term of this patent is extended or adjusted under 35 U.S.C. 154(b) by 191 days.

(21) Appl. No.: 18/242,053

(22) Filed: Sep. 5, 2023

(65) Prior Publication Data

US 2025/0078829 A1    Mar. 6, 2025

(51) Int. Cl.
*G10L 15/197* (2013.01)
*G10L 15/30* (2013.01)

(52) U.S. Cl.
CPC ............ *G10L 15/197* (2013.01); *G10L 15/30* (2013.01)

(58) Field of Classification Search
CPC ..... G10L 15/197; G10L 15/30; G10L 15/183; G10L 15/32
USPC ........................................................ 704/235
See application file for complete search history.

(56) References Cited

U.S. PATENT DOCUMENTS

| | | | | | |
|---|---|---|---|---|---|
| 5,195,167 | A | * | 3/1993 | Bahl ..................... | G10L 15/063 704/200 |
| 11,321,956 | B1 | * | 5/2022 | Geng ................... | G06V 30/414 |

| | | | | | |
|---|---|---|---|---|---|
| 11,922,126 | B1 | * | 3/2024 | Zhang ..................... | G06F 40/30 |
| 2006/0271364 | A1 | * | 11/2006 | Mirkovic ................ | G10L 15/22 704/E15.044 |
| 2010/0057450 | A1 | * | 3/2010 | Koll ........................ | G10L 15/32 704/270.1 |
| 2011/0184730 | A1 | * | 7/2011 | LeBeau ................... | G10L 15/30 704/235 |
| 2012/0179469 | A1 | * | 7/2012 | Newman ................. | G10L 15/30 704/E11.001 |
| 2013/0085753 | A1 | * | 4/2013 | Bringert ................. | G10L 15/32 704/E15.039 |
| 2013/0132089 | A1 | * | 5/2013 | Fanty ..................... | G10L 15/30 704/270 |
| 2015/0112679 | A1 | * | 4/2015 | Zhang ..................... | G10L 15/26 704/243 |
| 2015/0112685 | A1 | * | 4/2015 | Zhang ..................... | G10L 15/32 704/257 |

(Continued)

OTHER PUBLICATIONS

Vanhoucke, Vincent, "Confidence Scoring and Rejection using Multi-Pass Speech Recognition", InterSpeech 2005, Sep. 4, 2005, pp. 3133-3136. (Year: 2005).*

(Continued)

*Primary Examiner* — Thuykhanh Le
(74) *Attorney, Agent, or Firm* — Kilpatrick Townsend & Stockton LLP

(57) ABSTRACT

One example method includes receiving an audio stream comprising speech; generating, by automatic speech recognition ("ASR") software, a plurality of hypotheses, each hypothesis comprising a transcription of a first portion of the speech; rescoring, using a first trained language model, each hypothesis of the plurality of hypotheses; and responsive to a first hypothesis not satisfying a threshold, generating and outputting, using a trained large language model ("LLM"), a final transcription based on the plurality of hypotheses.

20 Claims, 6 Drawing Sheets

(56)                    References Cited

U.S. PATENT DOCUMENTS

| | | | | |
|---|---|---|---|---|
| 2015/0243285 A1* | 8/2015 | Lane | G10L 15/22 | |
| | | | | 704/256.1 |
| 2015/0371631 A1* | 12/2015 | Weinstein | G10L 15/08 | |
| | | | | 704/256.4 |
| 2015/0371633 A1* | 12/2015 | Chelba | G10L 15/063 | |
| | | | | 704/240 |
| 2016/0217127 A1* | 7/2016 | Segal | G06F 40/289 | |
| 2018/0053502 A1* | 2/2018 | Biadsy | G10L 15/08 | |
| 2018/0096678 A1* | 4/2018 | Zhou | G10L 15/08 | |
| 2019/0378495 A1* | 12/2019 | Kim | G10L 15/063 | |
| 2020/0013391 A1* | 1/2020 | Park | G10L 15/04 | |
| 2020/0175961 A1* | 6/2020 | Thomson | G10L 15/063 | |
| 2020/0285699 A1* | 9/2020 | Nogima | G10L 15/183 | |
| 2021/0193116 A1* | 6/2021 | Geramifard | G10L 15/22 | |
| 2021/0210081 A1* | 7/2021 | Park | G10L 15/22 | |
| 2021/0295846 A1* | 9/2021 | Yang | G10L 25/30 | |
| 2022/0246150 A1* | 8/2022 | Pust | G08G 5/53 | |
| 2022/0256209 A1* | 8/2022 | Vartakavi | H04N 21/84 | |
| 2022/0269861 A1* | 8/2022 | Kim | G06V 10/82 | |
| 2022/0310064 A1* | 9/2022 | Shao | G10L 15/16 | |
| 2022/0310081 A1* | 9/2022 | Gaur | G10L 15/22 | |
| 2022/0376994 A1* | 11/2022 | Mishra | G06N 3/096 | |
| 2022/0383044 A1* | 12/2022 | Bellegarda | G06F 18/2148 | |
| 2022/0391596 A1* | 12/2022 | Yoshikawa | G06F 40/40 | |
| 2023/0076658 A1* | 3/2023 | Li | G10L 15/197 | |
| 2023/0096821 A1* | 3/2023 | Huang | G10L 15/197 | |
| | | | | 704/235 |
| 2023/0298570 A1* | 9/2023 | Wang | G10L 15/063 | |
| | | | | 704/232 |
| 2023/0335126 A1* | 10/2023 | Huang | G10L 15/16 | |
| 2023/0343324 A1* | 10/2023 | Baeuml | G10L 15/063 | |
| 2023/0359835 A1* | 11/2023 | Malur Srinavasan | G06F 40/30 | |
| 2024/0144922 A1* | 5/2024 | Pandita | G10L 15/22 | |
| 2024/0194188 A1* | 6/2024 | Weisz | G10L 15/22 | |
| 2024/0203399 A1* | 6/2024 | Stooke | G06N 3/0442 | |
| 2024/0203404 A1* | 6/2024 | Shabat | G10L 15/16 | |
| 2024/0211690 A1* | 6/2024 | Faizakof | G06V 30/19093 | |
| 2024/0385814 A1* | 11/2024 | Fu | G06F 8/35 | |
| 2025/0005277 A1* | 1/2025 | Li | G06F 40/166 | |
| 2025/0045530 A1* | 2/2025 | Reddy | G06F 40/40 | |
| 2025/0053822 A1* | 2/2025 | Shmueli | G06N 3/091 | |
| 2025/0061279 A1* | 2/2025 | deLevie | G06F 40/131 | |
| 2025/0063239 A1* | 2/2025 | Gustman | H04N 21/8545 | |
| 2025/0071202 A1* | 2/2025 | Daya | G10L 15/26 | |
| 2025/0077762 A1* | 3/2025 | Schauer | G06F 40/109 | |
| 2025/0077857 A1* | 3/2025 | Xu | G06N 3/08 | |
| 2025/0078549 A1* | 3/2025 | Achiwa | G06V 30/416 | |
| 2025/0141820 A1* | 5/2025 | Rosenberg | H04L 51/04 | |

OTHER PUBLICATIONS

EP International Search Report and Written Opinion for PCT/US2024/042228 mailed Oct. 9, 2024.

Vanhoucke, Vincent, "Confidence Scoring and Rejection using Multi-Pass Speech Recognition", InterSpeech 2005, Sep. 4, 2005, pp. 3133-3136.

Ma et al., "Can Generative Large Language Models Perform ASR Error Correction?"; arxiv.org, Cornell University Library, Ithaca, NY, Jul. 9, 2023; pp. 1-8.

Min et al., "Exploring the Integration of Large Language Models into Automatic Speech Recognition Systems: An Empirical Study", arxiv.org, Cornell University Library, Ithaca, NY Jul. 13, 2023; pp. 1-16.

\* cited by examiner

AUTOMATIC SPEECH RECOGNITION USING MULTIPLE LANGUAGE MODELS

FIELD

The present application generally relates to automatic speech recognition, and more particularly relates to automatic speech recognition using multiple language models.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
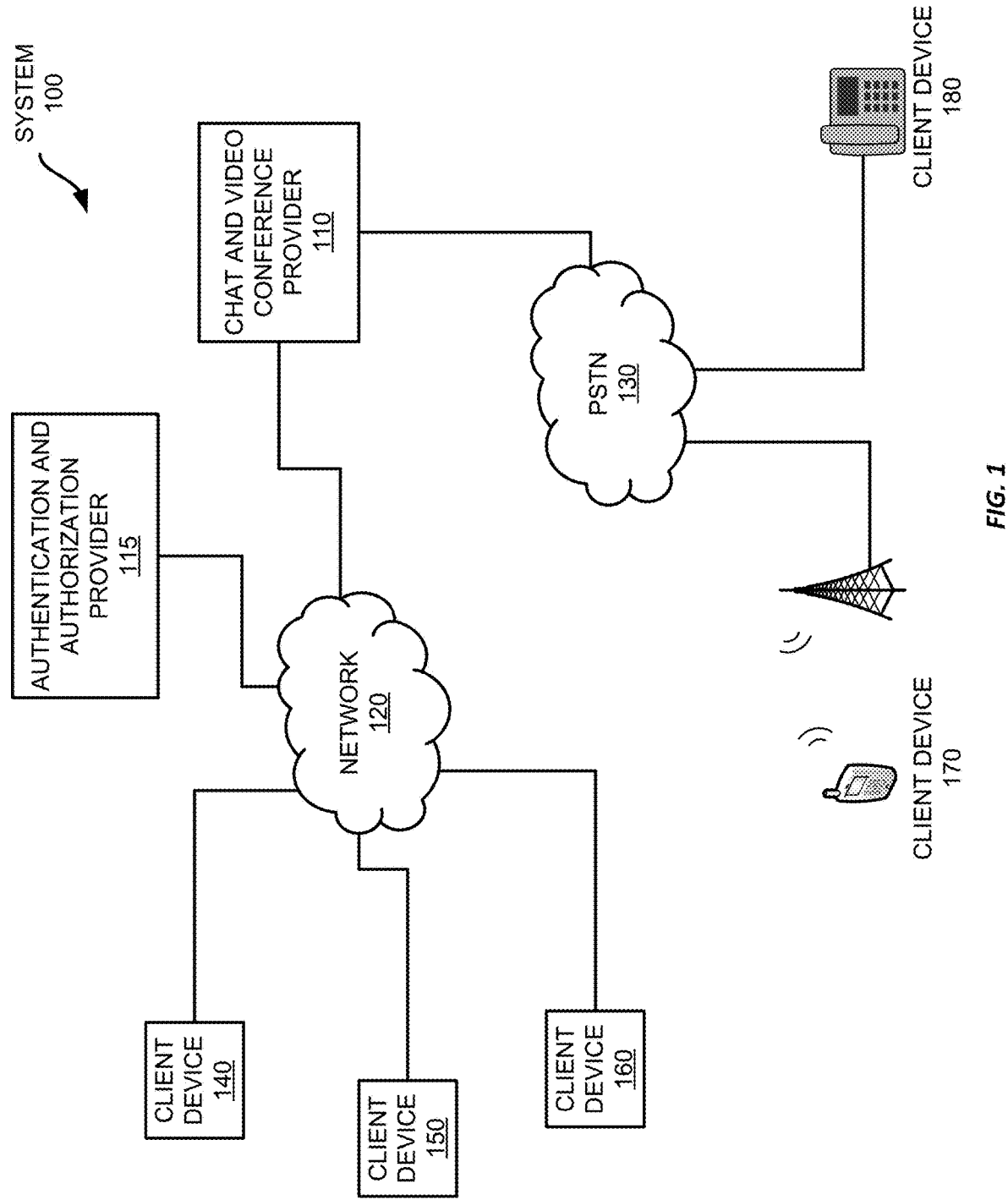
FIGS. 1 and 2 show example systems for automatic speech recognition using multiple language models.

Examples are described herein in the context of automatic speech recognition using multiple language models. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically, such participants will interact in a virtual conference using a camera and microphone, which provides video and audio streams (each a "media" stream) that can be delivered to the other participants by the virtual conference provider and be displayed via the various client devices' displays or speakers. Thus, the participants are able to interact with each other as though they are physically together at the same location.

Because virtual conferences typically are hosted by a virtual conference provider, the virtual conference provider may provide the option to record the virtual conference or generate a transcript of the meeting for the participants. If one or more of the participants requests to record the meeting, the virtual conference provider may then obtain consent from the other participants and, assuming consent is provided, begin recording the various video and audio feeds to data storage. Similarly, if one or more participants requests a transcript of the meeting, the virtual conference provider may obtain consent from the other participants, if not already obtained as a part of a recording request, and record the audio streams to generate a transcript.

Generating a transcript involves the use of speech recognition on the various recorded audio streams and transcribing the recognized words from each audio stream. However, conventional automatic speech recognition ("ASR") systems may suffer from performance issues, such as a lack of accuracy. This can lead to incorrect words included in the transcript or unnatural phrases or grammatical errors. To help improve the performance of conventional ASR systems, multiple language models may be used to refine the output of an ASR system.

For example, a conventional ASR system may be provided with a stream of recorded audio, such as from a virtual conference recording. The ASR system can obtain utterances from the audio and generate candidate transcriptions of the utterances, referred to as "hypotheses." The ASR system typically outputs multiple hypotheses per utterance along with a corresponding score for the utterance. These utterances can then be rescored using a language model of any suitable type, such as an auto-regressive language model. The language model accepts the hypotheses as inputs and generates a new score for each hypothesis. The new scores can then optionally be combined with the scores generated by the ASR system, such as by using a weighted sum approach. The hypothesis with the highest score (after rescoring) is compared to a threshold. If the score satisfies the threshold, the corresponding hypothesis can be output as the transcribed speech. However, if the score does not satisfy the threshold, a second language model can be employed.

The second language model in this example is a large language model ("LLM"), such as ChatGPT-3, ChatGPT-3.5, or ChatGPT-4. The rescored hypotheses are then provided to the LLM as well as one or more constraints, provided as natural language inputs or "prompts." For example, one prompt may be "Only replace words in the original sentence with ones from variant sentences. Do not simply add or delete words." In addition, the best hypothesis is identified to the LLM and will serve as the basis of its processing. The LLM then generates and outputs a transcription based on the inputted hypotheses and any supplied constraints. The transcription output by the LLM is provided as the transcribed speech. Subsequent utterances may then be inputted into the example system to continue to generate transcribed speech from the audio recording, ultimately resulting in a full transcript of the recording.

The use of the two language models may provide increased speech recognition ("SR") accuracy by using their very large number of neurons and massive training set to hone the initial output of a conventional ASR system. Further, the use of an LLM with natural language prompts may enable the outputted speech to be tailored according to the preferences of a particular user or administrator. In addition, constraints such as specialized terms or keywords 304 can be used to enhance the ability of the example system to operate in specialized domains, like medicine, law, or engineering without specially training an ASR system on such domain-specific language.

This illustrative example is given to introduce the reader to the general subject matter discussed herein and the disclosure is not limited to this example. The following sections describe various additional non-limiting examples and examples of automatic speech recognition using multiple language models.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
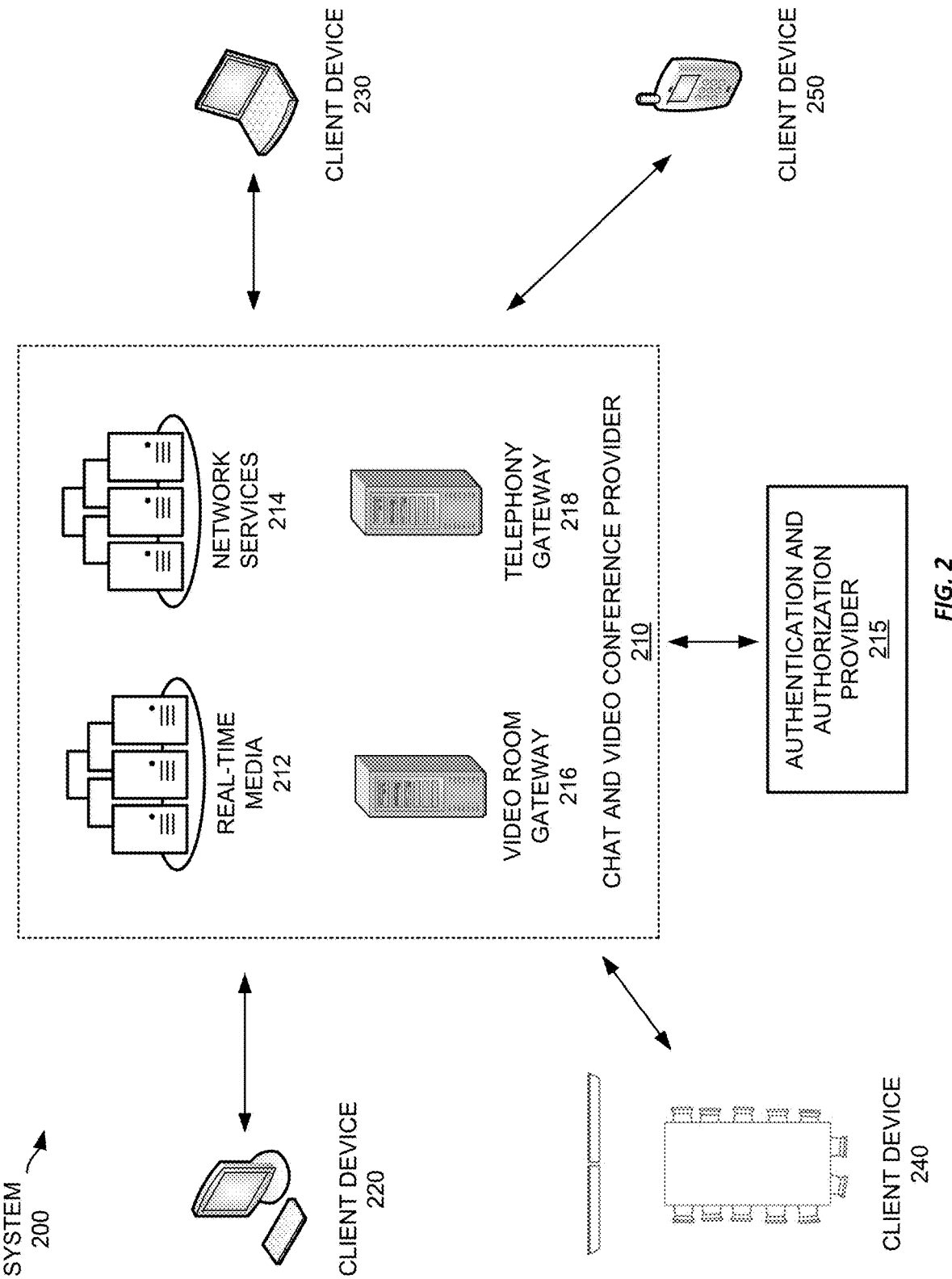

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers

214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
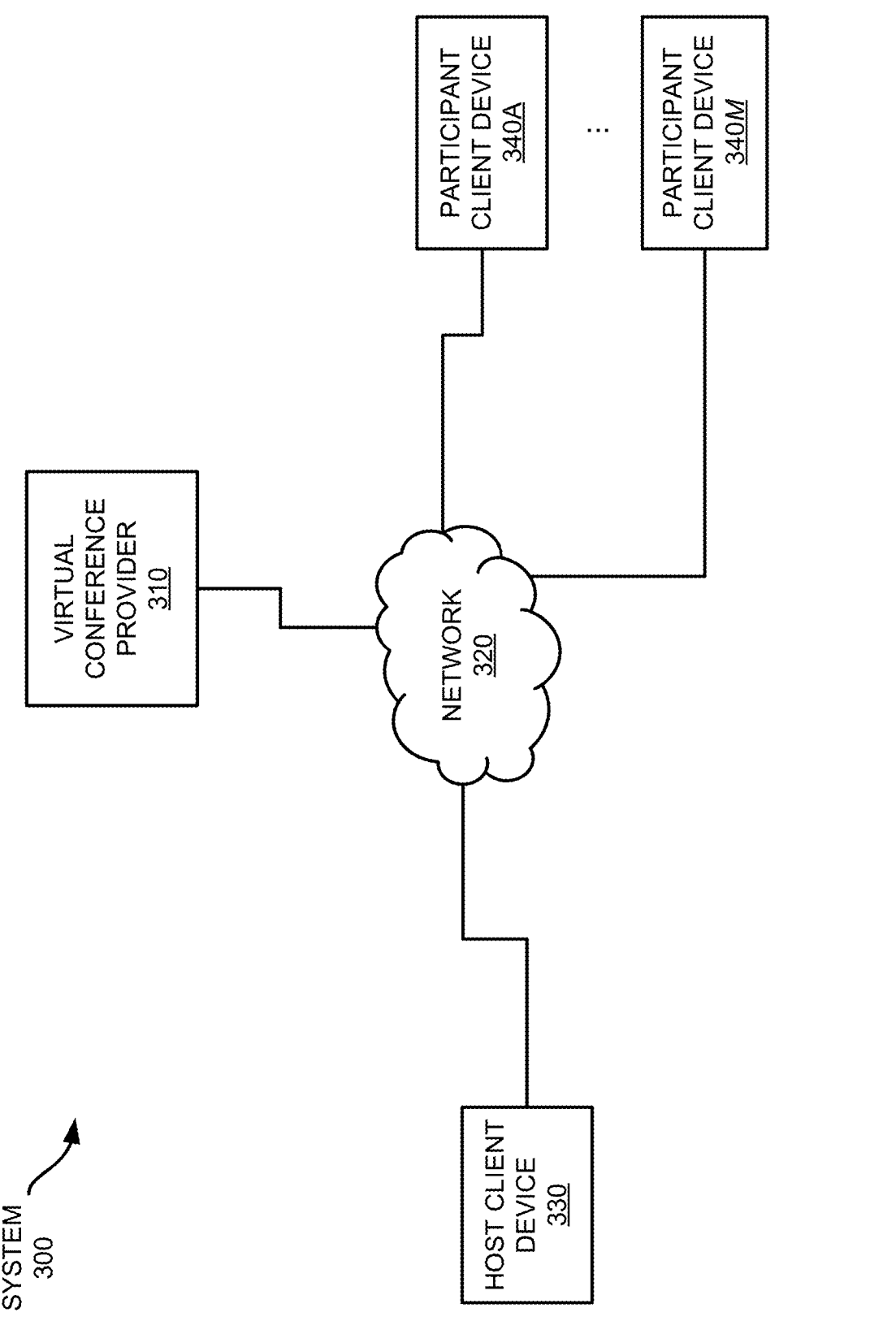
FIGS. 3A-3B show an example system for automatic speech recognition using multiple language models.
Figure 3B:
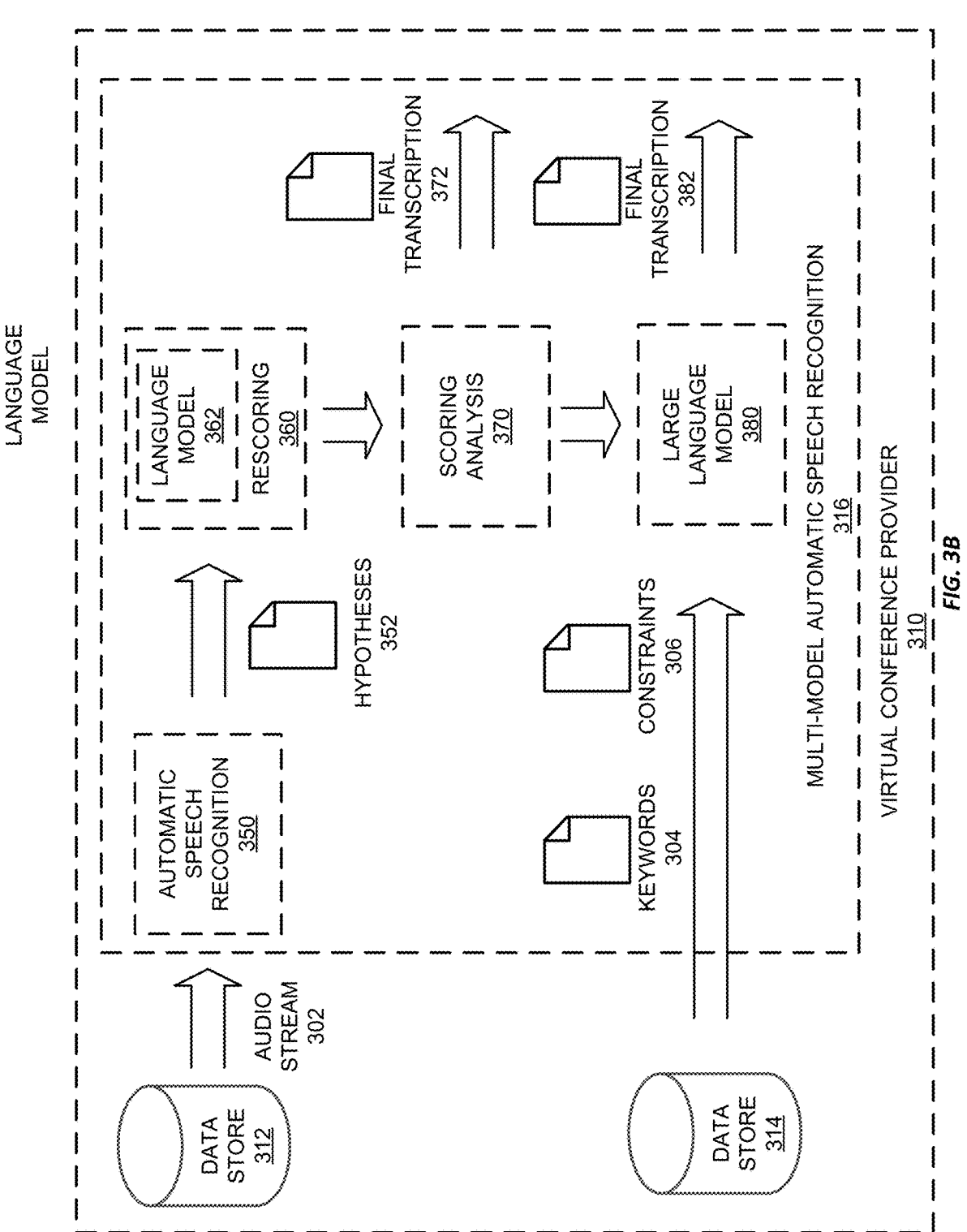

Referring now to FIGS. 3A-3B, FIG. 3A shows an example system 300 for automatic speech recognition using multiple language models. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software that connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves. The virtual conference provider 310 is configured to host meetings between different users and can record the audio and video streams from those meetings to provide a recording of the meeting or to generate a transcript using an example system for automatic speech recognition using multiple language models according to this disclosure.

Referring now to FIG. 3B, FIG. 3B illustrates the virtual conference provider 310 discussed above with respect to FIG. 3A. The virtual conference provider in this example has been configured with a multi-model ASR system 316 to provide automatic speech recognition using multiple language models. The multi-model ASR system 316 includes ASR functionality 350 as well as a rescoring component 360 that includes a language model 362, scoring analysis functionality 370, and a large language model 380. While each of these components is depicted as being part of the virtual conference provider 310, it should be appreciated that they may be distributed across any number of computing devices managed by the virtual conference provider 310. Further, in some examples, one or more components may be hosted by a third party that is accessible by the virtual conference provider 310. In this example, however, all components are hosted by the virtual conference provider 310.

In this example system, the ASR functionality 350 is a conventional ASR system that is configured to generate an "N-best" list, or a list of proposed transcriptions of an utterance, which are generally referred to as "hypotheses" within this disclosure. In this example, a transformer network is employed, but other suitable ASR functionalities 350 may be embodied by recurrent neural networks, long short-term memory networks, or any other suitable ASR system that can generate multiple hypotheses from an inputted utterance. An "utterance" refers to audio that includes one or more spoken words. The utterance may represent a word, phrase, sentence, thought, or other grouping of words. From the utterance, the ASR functionality 350 generates multiple hypotheses from a beam search of ASR decoding. In some examples, the ASR functionality 350 may also generate a corresponding score for each hypothesis.

The rescoring component 360 accepts the hypotheses 352 output by the ASR functionality 350 and generates a score for each using a language model 362. Any suitable language model may be used as a rescoring language model 362, such as auto-regressive language models, bidirectional encoder representation from transformers ("BERT") models, or large language models (such as GPT-2, GPT-J, ChatGPT-3.5, or ChatGPT-4). In this example, an auto-regressive language model is employed as the rescoring language model 362.

In this example, rescoring involves generating the log-likelihood of each hypothesis within the hypotheses 352 generated by the ASR functionality 350, such as using the following equation for each hypothesis, y:

$$\text{Score}_{LM}(y) = \log P_{LM}(y) = \sum_{i=1}^{L} P_{LM}(y_i \mid y_{<i})$$

where $y_{<i}=(y_1, \ldots, y_{i-1})$. It should be appreciated that because auto-regressive LLMs are unidirectional in the sense that the prediction of $y_1$ only depends on the previous context, which makes it computationally efficient, only requiring a single inference pass to compute the log-likelihood in an auto-regressive manner. However, any technique for generating score indicating probabilities that each hypothesis includes a sequence of words according to a particular language, such as the softmax function.

If the ASR functionality 350 generates its own scores, the scores generated by the rescoring functionality 360 are combined with the original ASR scores for the corresponding hypotheses to generate a new score. In this example, the scores are combined using the following equation:

$$\text{Score}(y) = \log P_{ASR}(y \mid x) + \alpha \, \log P_{LM}(y)$$

where x denotes acoustic features, y denotes the hypothesis from the ASR functionality 350, and a is a hyper-parameter weight. In this case, a is set to three, though any suitable value may be used. However, any suitable technique to combine the scores may be employed.

After rescoring, scoring analysis 370 identifies the hypothesis with the best score and evaluates one or more thresholds. In this example, the scoring analysis 370 compares the highest score against a threshold score. If the score is greater than the threshold score, the threshold is satisfied. The scoring analysis 370 then outputs the hypothesis as the final transcription of the inputted utterance.

In some examples, additional thresholds may be used, however. For example, another threshold may be established to evaluate a difference in score between the highest score and the second-highest score, after rescoring. The difference of these two scores may then be compared against the additional threshold, and if it is greater than the threshold, the additional threshold is satisfied. And still further thresholds may be employed, such as differences between the highest score and the average of the remaining scores or the average of the top three scores. In some examples, entropy associated with the hypotheses may be employed to evaluate the best hypothesis. Further, in some examples, the scores output by the ASR functionality 350 and the rescoring functionality 360 may be compared to separate predefined thresholds.

It should be appreciated as well that while the example above contemplates scores where a higher score is better, other scoring domains may be employed. For example, in some examples, the lowest score may be the "best" score or a score closest to zero or another value may be the best score. Thus, a threshold may be a score, a difference between two values, such as a score and a limit value, or any other suitable metric that can be compared against the output by the rescoring functionality 360. Further, while the inequality "greater than" was specified above, any suitable comparison may be employed, such as "greater than or equal," "less than," "less than or equal," or whether a score is within a particular range.

If the highest score does not satisfy the threshold(s), a LLM 380 is employed. In this example, the LLM 380 comprises the ChatGPT-4 LLM, though any suitable LLM, such as ChatGPT-3.5, Language Model for Dialogue Applications (or "LaMDA") (such as Google Bard), DeepMind Sparrow, including future versions of any of these or other LLMs, may be used. The LLM 380 receives the hypotheses generated by the ASR functionality 350 and a request to provide a corrected transcription of the best hypothesis identified before rescoring. In addition, the LLM 380 may be provided with one or more constraints 306 to assist it with generating and outputting a corrected transcription.

Because the LLM 380 employs the ChatGPT-4 LLM, which accepts natural language queries and prompts, the LLM 380 is provided the best hypothesis and the constraints 306 as natural language instructions. The constraints 306 may be predetermined and stored in a data store 314 to be later provided to the LLM 380 to assist or otherwise constrain its processing of the best hypothesis. However, it should be appreciated that "constraints" provided to the LLM 380 may not be strictly adhered to by the LLM 380 due to the particular LLM that is employed, but instead may provide guidance to the LLM 380, which may be partially or totally ignored in the course of generating a final transcription based on the best hypothesis.

Constraints 306 may include requirements to limit the words used in the final transcription to those found within the set of hypotheses output by the ASR functionality 350, maintaining the same sentence structure or number of words in the best hypothesis, ignoring punctuation, etc. For example, the following set of predetermined constraints may be provided to the LLM 380:

I want you to check and correct potential errors in one sentence according to the following rules. Here is the sentence to work on: [best hypothesis].

You need to first consider the following variant sentences and only pick corrected words from them: [set of hypotheses].

Here are some additional rules for this correction:

1. If any word in the original sentence looks weird or inconsistent, then replace it with a corresponding word from variant sentences.
2. You don't have to modify the original sentence if it already looks good.
3. Keep the sentence structure and word order intact.
4. Only replace words in the original sentence with ones from variant sentences. Do not simply add or delete words.
5. Try to make the corrected sentence have the same number of words as the original sentence.
6. Ignore punctuation.
7. Use U.S. English.
8. Output only one modified sentence and no need to provide explanation.

However, any one or more of the constraints above may be omitted in some examples. For example, some examples may not include a constraint to ignore punctuation. In addition, while the constraints above specify U.S. English, any language or language dialect may be specified, as appropriate for a particular context.

In addition, other constraints may be provided instead or in addition to these. For example, additional constraints may include one or more specialized words 304, such as associated with a particular field, a particular project, or a particular industry or company. One or more lists of such words may be stored in data store 314 and accessed by scoring analysis 370 to provide to the LLM 380. A suitable constraint to employ such specialized words 304 may be "Only replace words in the original sentence with ones from variant sentences or from the following list of words: [specialized words]. Do not simply add or delete words." Another constraint may be to generate a semantically identical or similar sentence without verbal pauses, or to generate a verbatim transcript including verbal pauses.

One issue with LLMs that may be addressed by using constraints 306 is that LLMs may have a propensity to "hallucinate," such as by performing a semantic analysis of the best hypothesis and then generate words or phrases to elaborate upon the semantic content of the hypothesis, thereby generating a transcription that includes words not present in the original utterance. To help reduce the likelihood of such hallucinations, constraints such as (3) and (5) in the example constraints above may be employed, which constrain the length and vocabulary to be used in generating the transcription from the best hypothesis. Thus, the LLM

380 can be instructed to generate a transcription rather than to employ any "creativity" in generating the final transcription.

Another technique to limit the LLM's propensity to hallucinate, or to limit its "creativity," is to adjust a "temperature" or equivalent hyperparameter of the LLM 380. Generally, temperature relates to flexibility in selecting words for use in a sequence of words, thereby allowing the use of words with lower probabilities. The lower the temperature setting for ChatGPT-4, the more likely the LLM 380 will generate outputs that are truer to a particular format or guideline, while a higher temperature setting affords more variability, flexibility, and, potentially, less coherence in its outputs. Thus, a constraint 306 supplied to the LLM 380 may include a temperature, or equivalent hyperparameter (or set of hyperparameters, depending on the LLM employed). In this example, a temperature of 0.2 (from a range of 0.0-1.0) is employed, however, any suitable temperature may be used.

After the LLM 380 has received the inputted hypotheses and constraints 306, it operates to generate and output a finalized transcription. It should be appreciated that while the multi-model ASR system 316 depicted in FIG. 3B employs a rescoring language model 362 and a LLM 380, which are described as being different models, in some examples, the LLM 380 may be used to provide rescoring as well and thus may operate as the rescoring language model 362. Thus, while the same model may be used for different purposes, the different uses of the same model can provide for improved automatic speech recognition according to this disclosure.

It should be appreciated that the architecture depicted in FIG. 3B provides an example implementation and division of functionality within a system for ASR using multiple language models. Systems according to this disclosure need not be divided or grouped as depicted in FIG. 3B. Further, different components of examples systems according to this disclosure may be provided by multiple entities. For example, a virtual conference provider 310 or other entity may communicate with a third-party system that provides a LLM 380 usable in conjunction with functionality provided by the virtual conference provider 310 or other entity.

Figure 4:
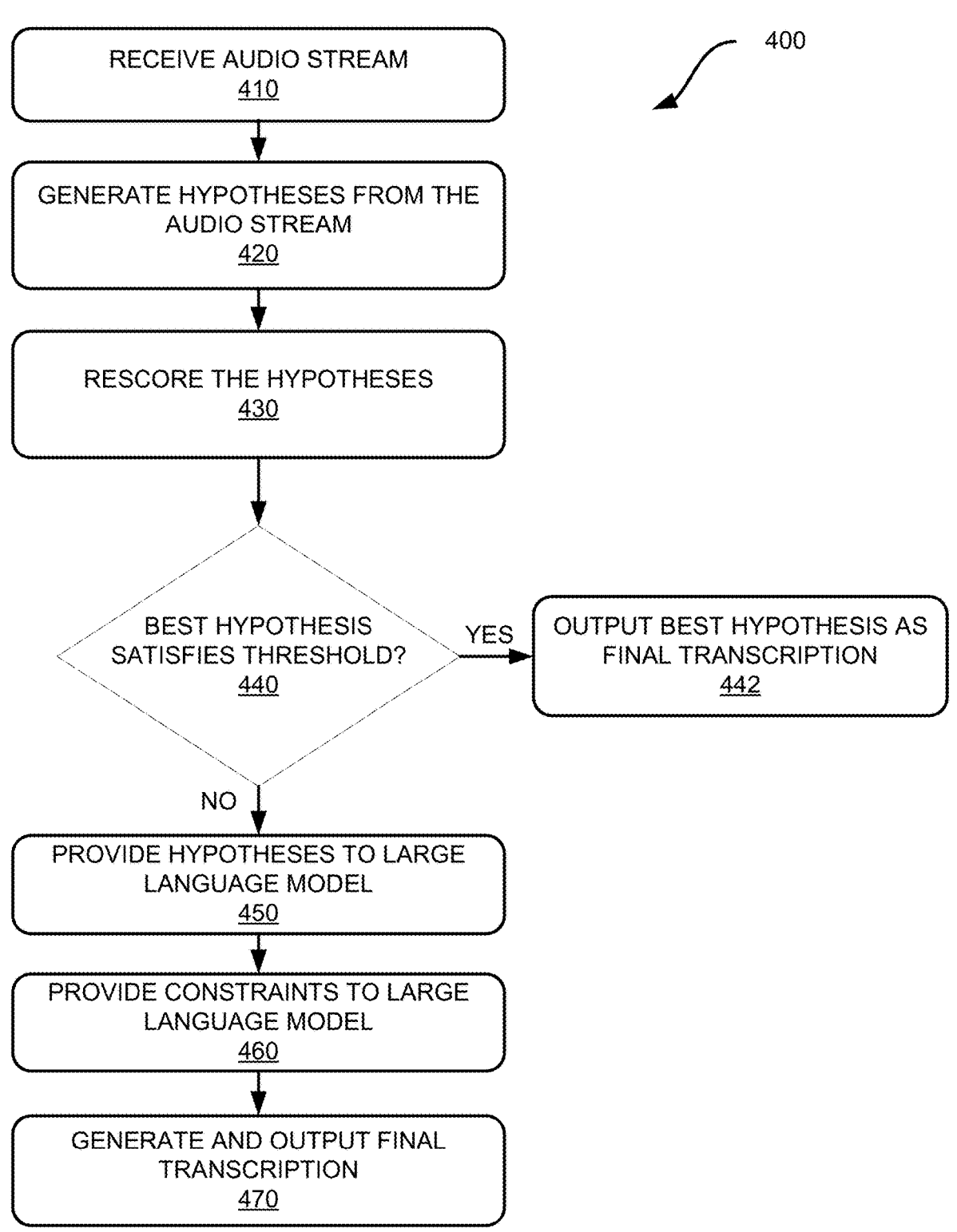
FIG. 4 shows an example system for automatic speech recognition using multiple language models.

Referring now to FIG. 4, FIG. 4 shows an example method for automatic speech recognition using multiple language models. The example method 400 will be described with respect to the system 300 and virtual conference provider 310 shown in FIGS. 3A-3B; however, any suitable system may be employed according to different examples.

At block 410, ASR functionality 350 receives an audio stream 402 from data store 312 that includes recorded speech of one or more individuals. In this example, the audio stream is from a previously recorded virtual conference hosted by a virtual conference provider 310. However, the audio stream 402 may be obtained from any suitable source, including from a personal voice recorder.

At block 420, the ASR functionality 350 generates a plurality of hypotheses, each of which includes a candidate transcription of an utterance from the audio stream. As discussed above with respect to FIG. 3B, the ASR functionality can generate a set of hypotheses and, in some examples, may also generate corresponding scores for the hypotheses. Each hypothesis includes a textual representation of the utterance.

At block 430, a trained language model rescores each hypothesis from the set of hypotheses generally as described above with respect to the rescoring functionality 360 and rescoring language model 362 in FIG. 3B.

At block 440, the scoring analysis functionality 370 determines whether the best hypothesis satisfies a threshold. As discussed above with respect to FIG. 3B, scoring analysis 370 may analyze scores determined by the ASR functionality 350 and the rescoring functionality 360 to determine whether one or more thresholds have been satisfied. If the corresponding threshold(s) have been satisfied, the best hypothesis provides an accurate transcription of an utterance from the received audio stream and the method 400 proceeds to block 442. Otherwise, the method 400 proceeds to block 450.

At block 442, the best hypothesis based on the analysis at block 440 is output as the final transcription of the corresponding utterance from the received audio stream. For example, the best hypothesis may be inserted into a transcript being generated from a virtual conference. In some examples, the multi-model ASR system 316 may be employed to transcribe a recording of a dictation or of a proceeding, such as a legal proceeding, clinical or medical meeting, or any other scenario where an audio recording is made and stored that can be provided to an example system according to this disclosure.

At block 450, the hypotheses generated by the ASR functionality 350 are provided to the LLM 380. In this example, the best hypothesis is identified, and the remaining hypotheses are provided separately. In some examples, only a subset of the remaining hypotheses is provided, such as a fixed number or percentage of the remaining hypotheses. For example, if the ASR functionality 350 generates ten hypotheses, only the top five remaining hypotheses are provided in addition to the best hypothesis. In some examples, only hypotheses that satisfy a threshold may be provided to the LLM 380. Thus, if one or more hypotheses have poor scores, they may be omitted from the set of hypotheses provided to the LLM 380.

At block 460, one or more constraints 306 are provided to the LLM 380. As discussed above with respect to FIG. 3B, the multi-model ASR system 316 may store one or more predetermined constraints 306 within a data store 314. One or more of these constraints 306 may be obtained by the multi-model ASR system 316 and provided to the LLM 380 to configure the LLM 380 to process the best hypothesis. As discussed above, constraints 306 may include one or more keywords 304, which may be provided as alternative words to those present in the hypotheses and used to generate a final transcription.

At block 470, the LLM 380 generates and outputs a final transcript based on the plurality of hypotheses. As discussed above, after the LLM 380 has been provided the best hypothesis and one or more additional hypotheses, it can generate a final transcription by modifying the best hypothesis. Further, it may also employ the one or more constraints 306, including any keywords 304, provided by the multi-model ASR system 316. It should be appreciated that generating the final transcription may not modify the best hypothesis at all, in some cases. Thus, the LLM 380 may be determine that the best hypothesis is sufficiently accurate and output the best hypothesis as the final transcription of the utterance from the received audio stream 302.

After outputting the final transcription of the utterance, the method 400 may repeat for the next utterance from the received audio stream 302 and continue to repeat until the audio stream 302 has been fully processed to generate a complete transcript.

Figure 5:
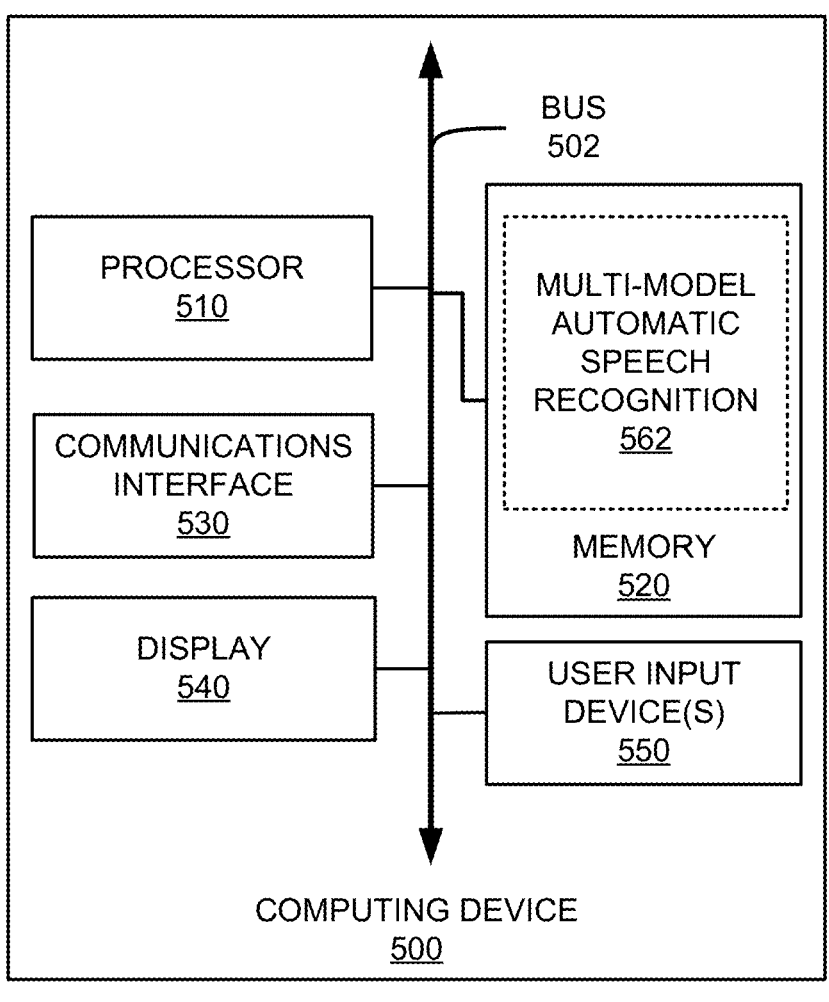
FIG. 5 shows an example computing device suitable for use with systems and methods for automatic speech recognition using multiple language models.

Referring now to FIG. 5, FIG. 5 shows an example computing device 500 suitable for use in example systems or methods for ASR using multiple language models according to this disclosure. The example computing device 500 includes a processor 510 which is in communication with the memory 520 and other components of the computing device 500 using one or more communications buses 502. The processor 510 is configured to execute processor-executable instructions stored in the memory 520 to perform one or more methods for ASR using multiple language models according to different examples, such as part or all of the example methods described above with respect to FIG. 4. Suitable example computing devices 500, such as user client devices, may also include one or more user input devices 550, such as a keyboard, mouse, touchscreen, microphone, etc., to accept user input. The computing device 500 also includes a display 540 to provide visual output to a user. In addition, the computing device 500 includes multi-model ASR software 562 to allow the computing device to receive audio streams and generating transcripts of speech within those audio streams.

The computing device 500 also includes a communications interface 540. In some examples, the communications interface 530 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

It should be appreciated that while the system shown in FIG. 3B is executed at a virtual conference provider, any computing device according to this disclosure may be employed to provide multi-model ASR. For example, a user's personal computing device, such as a desktop or laptop computer, may execute a portion or all of example multi-model ASR systems, such as the example shown in FIG. 3B. Further, such a user-hosted system may interact with a LLM 380 hosted by a third party to enable accurate ASR of recorded audio streams.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving an audio stream comprising speech;
   generating, by automatic speech recognition ("ASR") software, a plurality of hypotheses, each hypothesis comprising a transcription of a first portion of the speech;
   rescoring, using a first trained language model, each hypothesis of the plurality of hypotheses; and
   responsive to a first hypothesis not satisfying a threshold, generating and outputting, using a trained large language model ("LLM"), a final transcription based on the plurality of hypotheses.

2. The method of claim 1, further comprising:
   responsive to the first hypothesis satisfying the threshold, outputting the first hypothesis as the final transcription.

3. The method of claim 1, further comprising, responsive to the first hypothesis not satisfying the threshold:
   providing one or more constraints to the trained LLM.

4. The method of claim 3, wherein the one or more constraints comprises one or more of:
   (1) an identification of the first hypothesis as a best candidate,
   (2) a first constraint to use only words present in the plurality of hypotheses to generate the final transcription,
   (3) a second constraint to maintain a sentence structure or word order of the first hypothesis to generate the final transcription,
   (4) a third constraint to use a specific dialect of a language;
   (5) a fourth constraint to ignore punctuation in the plurality of hypotheses;
   (6) a fifth constraint to allow use of the first hypothesis without modification as the final transcription; or
   (7) a sixth constraint to generate the final transcription using the same number of words as the first hypothesis.

5. The method of claim 1, further comprising determining whether the first hypothesis satisfies the threshold based on a first confidence score corresponding to the first hypothesis.

6. The method of claim 5, wherein determining whether the first hypothesis satisfies the threshold is further based on a difference in the first confidence score and a second confidence score corresponding to a second hypothesis.

7. The method of claim 1, wherein rescoring each hypothesis of the plurality of hypotheses generates a score for each hypothesis; and further comprising determining a confidence of each score, wherein the threshold comprises a threshold confidence.

8. The method of claim 1, wherein the first trained language model is a LLM.

9. The method of claim 1, wherein the rescoring generates a plurality of second scores, each second score of the plurality of second scores corresponding to a different hypothesis of the plurality of hypotheses, and further comprising:
   generating, by the ASR software, a plurality of first scores, each first score of the plurality of first scores corresponding to a different hypothesis of the plurality of hypotheses;
   generating, for each hypothesis of the plurality of hypotheses, a combined score based on the corresponding first and second scores; and
   determining whether the first hypothesis satisfies the threshold based on a first combined confidence score corresponding to the first hypothesis.

10. A system comprising:
    a communications interface;
    a non-transitory computer-readable medium; and
    one or more processors configured to execute processor-executable instructions stored in the non-transitory computer-readable medium to:
    receive an audio stream comprising speech;
    generate, by automatic speech recognition ("ASR") software, a plurality of hypotheses, each hypothesis comprising a transcription of a first portion of the speech;
    rescore, using a first trained language model, each hypothesis of the plurality of hypotheses; and
    responsive to a first hypothesis not satisfying a threshold, generate and output, using a trained large language model ("LLM"), a final transcription based on the plurality of hypotheses.

11. The system of claim 10, wherein the one or more processors are configured to execute further processor-executable instructions stored in the non-transitory computer-readable medium to, responsive to the first hypothesis satisfying the threshold, output the first hypothesis as the final transcription.

12. The system of claim 10, wherein the one or more processors are configured to execute further processor-executable instructions stored in the non-transitory computer-readable medium to, responsive to the first hypothesis not satisfying the threshold, provide one or more constraints to the trained LLM.

13. The system of claim 12, wherein the one or more constraints comprises one or more of:

(1) an identification of the first hypothesis as a best candidate, (2) a first constraint to use only words present in the plurality of hypotheses to generate the final transcription, (3) a second constraint to maintain a sentence structure or word order of the first hypothesis to generate the final transcription, (4) a third constraint to use a specific dialect of a language;

(5) a fourth constraint to ignore punctuation in the plurality of hypotheses;

(6) a fifth constraint to allow use of the first hypothesis without modification as the final transcription; or (7) a sixth constraint to generate the final transcription using the same number of words as the first hypothesis.

14. The system of claim 10, wherein the one or more processors are configured to execute further processor-executable instructions stored in the non-transitory computer-readable medium to determine whether the first hypothesis satisfies the threshold based on a first confidence score corresponding to the first hypothesis.

15. The system of claim 14, wherein determining whether the first hypothesis satisfies the threshold is further based on a difference in the first confidence score and a second confidence score corresponding to a second hypothesis.

16. The system of claim 10, wherein rescoring each hypothesis of the plurality of hypotheses generates a score for each hypothesis; and wherein the one or more processors are configured to execute further processor-executable instructions stored in the non-transitory computer-readable medium to determine a confidence of each score, wherein the threshold comprises a threshold confidence.

17. The system of claim 10, wherein the first trained language model is a LLM.

18. The system of claim 10, wherein the rescoring generates a plurality of second scores, each second score of the plurality of second scores corresponding to a different hypothesis of the plurality of hypotheses, and wherein the one or more processors are configured to execute further processor-executable instructions stored in the non-transitory computer-readable medium to:

generate, by the ASR software, a plurality of first scores, each first score of the plurality of first scores corresponding to a different hypothesis of the plurality of hypotheses;

generate, for each hypothesis of the plurality of hypotheses, a combined score based on the corresponding first and second scores; and determine whether the first hypothesis satisfies the threshold based on a first combined confidence score corresponding to the first hypothesis.

19. A non-transitory computer-readable medium comprising processor-executable instructions configured to cause one or more processors to:

receive an audio stream comprising speech;

generate, by automatic speech recognition ("ASR") software, a plurality of hypotheses, each hypothesis comprising a transcription of a first portion of the speech;

rescore, using a first trained language model, each hypothesis of the plurality of hypotheses; and responsive to a first hypothesis not satisfying a threshold, generate and output, using a trained large language model ("LLM"), a final transcription based on the plurality of hypotheses.

20. The non-transitory computer-readable medium of claim 19, further comprising processor-executable instructions configured to cause one or more processors to, responsive to the first hypothesis not satisfying the threshold, provide one or more constraints to the trained LLM.

* * * * *